United States Patent [19]

Nishimura et al.

[11] Patent Number: 5,007,714
[45] Date of Patent: Apr. 16, 1991

[54] OPTICAL DEVICE

[75] Inventors: Yukuo Nishimura, Sagamihara; Masahiro Haruta, Tokyo; Hirohide Munakata, Yokohama; Yoko Kuwae; Toshihiko Miyazaki, both of Tokyo; Satoshi Yuasa, Yokohama, all of Japan

[73] Assignee: Canon Kabushiki Kaisha, Tokyo, Japan

[21] Appl. No.: 120,789

[22] Filed: Nov. 16, 1987

Related U.S. Application Data

[63] Continuation of Ser. No. 810,249, Dec. 18, 1985, abandoned.

[30] Foreign Application Priority Data

| Dec. 24, 1984 | [JP] | Japan | 59-272351 |
| Dec. 24, 1984 | [JP] | Japan | 59-272352 |
| Dec. 24, 1984 | [JP] | Japan | 59-272353 |
| Dec. 24, 1984 | [JP] | Japan | 59-272354 |
| Dec. 24, 1984 | [JP] | Japan | 59-272355 |
| Dec. 24, 1984 | [JP] | Japan | 59-272356 |
| Dec. 26, 1984 | [JP] | Japan | 59-276945 |
| Dec. 26, 1984 | [JP] | Japan | 59-276946 |
| Dec. 26, 1984 | [JP] | Japan | 59-276947 |

[51] Int. Cl.$^5$ .......................... G02F 1/01; G02B 5/23; G09G 3/34
[52] U.S. Cl. ................................ 350/353; 350/267; 350/362; 350/354; 340/788
[58] Field of Search .............. 350/354, 267, 353, 359, 350/360, 362, 363; 358/233, 236; 340/787, 788, 783, 758, 752, 763; 351/44, 47

[56] References Cited

U.S. PATENT DOCUMENTS

| 3,701,590 | 10/1972 | Zeltzer | 351/44 |
| 3,752,567 | 8/1973 | Broadhurst | 351/44 |
| 3,831,165 | 8/1974 | Chivian et al. | 350/354 |
| 3,877,797 | 4/1975 | Thornton, Jr. | 351/44 |
| 4,169,661 | 10/1979 | Yamada et al. | 350/353 |
| 4,307,942 | 12/1981 | Chahroudi | 350/353 |
| 4,536,061 | 8/1985 | Nishimura | 350/354 |
| 4,772,506 | 9/1988 | Siol et al. | 428/212 |

FOREIGN PATENT DOCUMENTS

| 2128761 | 12/1972 | Fed. Rep. of Germany . |
| 2505059 | 8/1975 | Fed. Rep. of Germany . |
| 2658643 | 7/1977 | Fed. Rep. of Germany . |
| 58-78758 | 5/1983 | Japan . |
| 59-214018 | 5/1983 | Japan . |
| 58-100819 | 6/1983 | Japan . |
| 59-072418 | 4/1984 | Japan . |

OTHER PUBLICATIONS

Chemical Abstracts, vol. 99, 213730u, 1983.

Primary Examiner—Eugene R. LaRoche
Assistant Examiner—Michael B. Shingleton
Attorney, Agent, or Firm—Fitzpatrick, Cella, Harper & Scinto

[57] ABSTRACT

An optical device is provided which comprises a liquid layer containing a liquid-absorbable and releasable polymer that absorbs and releases a liquid under thermal action.

2 Claims, 3 Drawing Sheets

OPTICAL DEVICE

This application is a continuation of application Ser. No. 810,489 filed Dec. 18, 1985, abandoned.

BACKGROUND OF THE INVENTION

1. Field of the Invention

This invention relates to an optical device for use in display devices, light modulator devices, etc., and particularly to a novel optical device utilizing the swelling and shrinking of gel under thermal action.

2. Description of the Prior Art

Non-luminous display devices have been regarded as being important because they can produce natural color tone and will not cause any fatigue to human eyes, and they include, for example, electrochromic display devices (ECD), liquid crystal display devices (LCD), etc. However, their quality and performance are not satisfactory. For example, ECD is so low in display contrast that it is hardly observable in a dim place and discrimination of a fine image is difficult at a distance On the other hand, LCD has such another disadvantage as a restricted angle of visual field, besides the said disadvantages.

There are the same problems as above even when they are used in the light modulator devices such as light shutters, etc.

SUMMARY OF THE INVENTION

An object of the present invention is to solve the problems in the prior art, and to provide a clear and good optical device.

Another object of the present invention is to provide a display device capable of producing a natural color tone and causing no fatigue in human eyes.

Further object of the present invention is to provide an optical device that can be readily prepared and utilized also as a light modulator device.

These objects can be attained according to the present invention.

The present invention provides an optical device which comprises a liquid layer containing a liquid-absorbable and releasable polymer that absorbs and releases a liquid under thermal action.

The present invention also provides an optical device which comprises a liquid layer containing a liquid-absorbable and releasable polymer that absorbs and releases a liquid under thermal action, and a liquid layer containing a colored liquid.

The present invention further provides an optical device which comprises a liquid layer. containing a liquid-absorbable and releasable colored polymer that absorbs and releases liquid under thermal action.

The present invention still further provides an optical device which comprises a liquid layer containing a liquid-absorbable and releasable polymer that absorbs and releases a liquid under thermal action, and a heat generating device for giving a thermal energy to the liquid layer.

BRIEF DESCRIPTION OF THE DRAWINGS

FIGS. 1(a), 1(b) and 1(c) are views showing schematic structures of an optical device according to the present invention, where

DETAILED DESCRIPTION OF THE PREFERRED EMBODIMENTS

The optical device according to the present invention has a broad meaning including a display device, a light modulator device, etc., and the term "gel" used in the present invention means a state of a liquid-absorbable and releasable polymer (reticular polymer) containing a liquid.

The present invention will be described in detail below, referring to the drawinss.

Figure 1A:
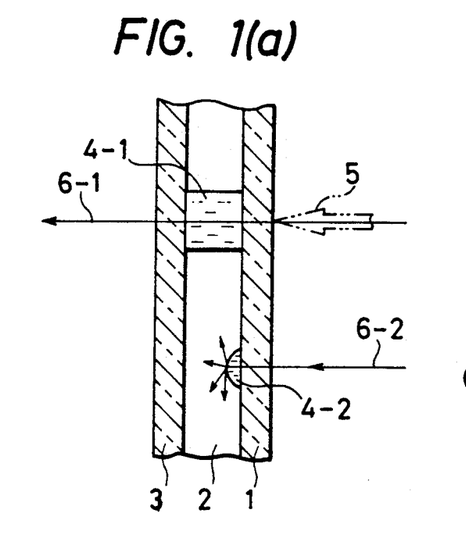
FIG. 1(a) shows an optical device of transmission type.
Figure 1B:
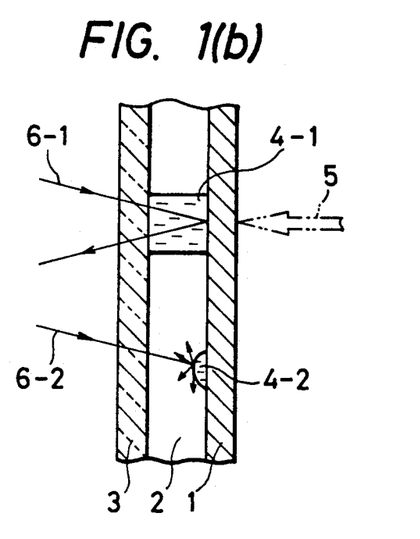
FIG. 1(b) shows an optical device of reflection type.

FIGS. 1(a) and 1(b) are views showing schematic structures of an optical device according to the present invention, where FIG. 1(a) shows an optical device of transmission type and FIG. 1(b) shows an optical device of reflection type, and numeral 1 is a substrate, 2 a gel-containing liquid layer, and 3 a transparent protective plate. An optical device comprises these members by lamination, as shown in the drawings.

Substrate 1 includes a transparent substrate, for example, glass, plastics, etc., and an opaque substrate, for example, metal such as aluminum, etc., and opaque plastic, etc.

The present optical device is available either for transmission type or for reflection type. In the case of transmission type, a transparent substrate is naturally used, and a material for the transparent substrate is used for the transparent protective plate 3.

The gel-containing liquid layer 2 is a layer containing a liquid and a liquid-absorbable and releasable polymer.

The liquid-absorbable and releasable polymer for use in the present invention can be classified into two major groups, to one of which belong polymers that will absorb a liquid at a higher temperature to undergo swelling and will release the liquid at a lower temperature to undergo shrinking, and to another of which belong polymers that will release liquid at a higher temperature and will absorb the liquid at a lower temperature.

The former polymers are three-dimensionally cross-linked polymers which are obtained by polymerizing a monomer such as of an acrylamide derivative as the main component in the presence of a cross-linkable linkable monomer, and have the said characteristics; for example, Enzafix P-SH (trade name of a product made by Wako Junyaku K.K., Japan), and three-dimensionally cross-linked polymers which are obtained by polymerizing an acrylamide derivative as the main component in the presence of an ionizable monomer and a cross-linkable monomer, for example, a terpolymer of acrylamide-acrylic acid-divinylbenzene.

The latter polymers include three-dimensionally cross-linked polymers which are obtained by polymerizing, for example, an acrylamide derivative as the main component in the presence of a cross-linkable monomer, and which have the said characteristics, for example, M-100 (trade name of a product made by Mitsui-Toatsu Kagaku K.K., Japan), and a terpolymer of N-isopropylacrylamide-acrylic acid-N,N'-methylenebisacrylamide, and three-dimensionally cross-linked polymers which are obtained by polymerizing an acrylate ester derivative as the main component in the presence of a cross-linkable monomer, for example, a copolymer of acrylic acid oligoethylene ester-divinylbenzene.

The liquid to be filled in the gel-containing liquid layer 2 includes water, organic solvents such as acetone, methanol, ethanol, t-butyl alcohol chloroform, N- methylpyrrolidone, pyridine, benzene, N,N-dimethylformamide, dimethylsulfoxide, etc., and their mixture.

When a colored liquid is used in the gel-containing liquid layer 2 to enhance the contrast or change the color tone (FIG. 3), a solution or dispersion of a coloring material in the said solvent is used, where it is necessary that the coloring material does not penetrate into the gels owing to any physical or chemical factor.

The coloring material includes, for example, polymer-bound coloring materials, that is, dyes such as Poly R-478, Poly S-119, Poly T-128 (all the foregoing products being made by Dinapole Co.), Seikagen W-Blue-BK1600, Seikagan W-Blue-1300 (all the foregoing products being made by Dainichi Seika K.K., Japan), and pigments and as Benzidine Yellow-GR, Chromophthal Orange 4R, Toluidine Maroon MT-2, Vulkan Fast Orange GG, Permanent Red F5R, Lithol Rubin GK, Brilliant Carmine 3B, Sanyo Red B-G511, Monastral Maroon, Permanent Red E5B, Permanent Pink E, Phthalocyanine Blue, Phthalocyanine Green, Naphthol Green BN, Diamond Black, etc.

When a colored polymer is used (FIG. 4), it is necessary that the coloring material exists limitedly only in the inside or around the inside surfaces of a polymer particle (reticular polymer).

The coloring material can be made to limitedly exist by so-called chemical binding, i.e. by chemically binding the coloring material with a reticular polymer, or by enclosure of macromolecules in the reticular by three-dimensional cross-linking reaction in the presence of macromolecules of coloring material.

The coloring material herein used includes reactive dyes such as Diamira Yellow G, Sumifix Red B, Diamira Brilliant Green 6B, Celmazol Brilliant Blue G, etc. besides the above-mentioned coloring materials.

When polymers that absorb a liquid at a higher temperature and release the liquid at a lower temperature is used in the present invention, it is preferable that the gel in the gel-containing liquid layer 2 is provided in accordance with the arrangement of image elements or apartures (which will be hereinafter referred to merely as "image elements"). The volume occupied by one piece of gel must be thoroughly smaller than the image element space (namely, image element area multiplied by thickness of the gel-containing liquid layer), and is preferably not more than ½ of image element space.

Figure 1C:
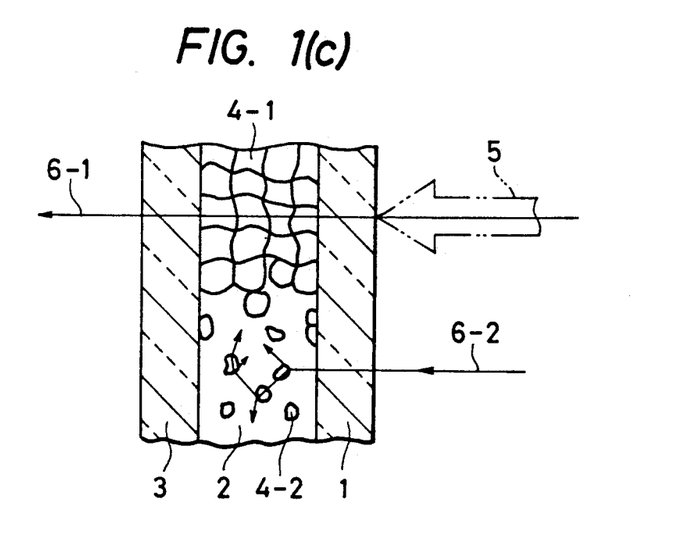
FIG. 1(c) shows an optical device utilizing an assembly of fine gel particles.

The image element space may be occupied not only by one gel, but also by an assembly of a plurality of minute pieces of gel [FIG. 1(c)]. In the latter case, the volume of the assembly must be thoroughly smaller than the image element space.

The gel is preferably fixed to one of a pair of substrates by a chemical or physical means, as will be described later.

When polymers that release a liquid at a higher temperature and absorb the liquid at a lower temperature are used, the size, shape and arrangement of gel in the gel-containing liquid layer can be selected as desired. The gel may be filled, as integrated, in the gel-containing liquid layer 2, or may be filled therein in a state of a cracked mass, a dispersion or a block.

Gel or an assembly of minute pieces of gel can be provided in accordance with the shape arrangement, etc. of image elements. Generally, the size of one gel is preferably approximately equal to that of the image element. The thickness of gel-containing liquid layer 2 is preferably 1 to 1,000 μm, more preferably 1 to 100 μm.

To efficiently give a thermal energy to the gel-containing liquid layer 2, a radiation-absorbing layer can be provided adjacent to the gel-containing liquid layer (FIG. 5) in the present invention. The radiation-absorbing layer, particularly an infrared-absorbing layer 7 can be obtained by making various known inorganic or organic materials that hardly undergo heat melting by themselves into a film. Such materials include, for example, Si, SiO, $SiO_2$, ZnS, $As_2S_3$, $Al_2O_3$, NaF, ZnSe, Cd.Tb.Fe, carbon black, metal phthalocyanine, etc. The radiation-absorbing layer can be provided irrespective of transmission type and reflection type. The thickness of radiation-absorbing layer is preferably 100 to 5,000 Å, and more preferably 200 to 2,000Å.

The temperature at which the polymers absorb a liquid or release the liquid depends on the species and combination of the polymer and solvent to be used, and practically is in a range of 5° to 80° C.

Image formation or light modulation principle of the present invention will be described below, referring to FIG. 1(a).

When there is no irradiation of infrared beam, the gel is not heated and thus is in a shrunk state (4-2). The gel will have light scattering and refracting properties, when it is very small, and thus the beam (6-2) is scattered or refracted by the gel (4-2), so that its rectilinear propagation is inhibited.

When an infrared beam 5 is irradiated onto a predetermined site in the gel-containing liquid layer 2 according to an information signal, etc. from the right side on the drawing on the other hand, the irradiated site (4-1) is heated, and then the gel (4-1) absorbs a liquid and swells As a result, the gel loses the light scattering and refracting properties, and the beam (6-1) passing therethrough can propagate rectilinearly.

The swollen gel (4-1) shrinks with lowering of temperature and returns to the original state to shut off the beam again.

By thermally controlling the gel volume as desired, the contrast, hue, etc. can be changed, and also a neutral tint can be obtained. The present invention utilizes such a principle as above in an optical device.

The foregoing description has been made of an optical device of transmission type, and is also applicable to an optical device of reflection type [FIG. 1(b)].

FIG. 1(c) shows an embodiment using an assembly of fine pieces of gel, where the image formation and light modulation principle are the same as in FIGS. 1(a) and (b).

Another embodiment of the present invention will be described below, referring to FIG. 2(a).

Without irradiation of infrared beam, the gel is not heated, and thus is in a swollen state (4-2). Thus, the beam 6-2 passing through the gel 4-2 propagates through the gel-containing liquid layer 2 without any scattering or refracting by the gel (4-2).

When an infrared beam 5 is irradiated onto a predetermined site of the gel-containing liquid layer 2 according to an information signal, etc. from the right side on the drawing, on the other hand, the irradiated site (4-1) is heated and thus the gel releases a liquid to undergo shrinking (4-1). The gel will have light scattering and refracting properties when the gel becomes much smaller, and thus the beam (6-1) passing through the shrunk gel (4-1) is scattered or refracted, so that its rectilinear propagation is inhibited. When fine gels are densely filled, as shown in FIG. 2 (b), clearances develop between the individual gels as the gel particles become finer, and similar optical effects can be obtained.

The shrunk gel (4-1) swells with lowering temperature and returns to the original state, and thus the beam can propagate rectilinearly again.

Figure 3:
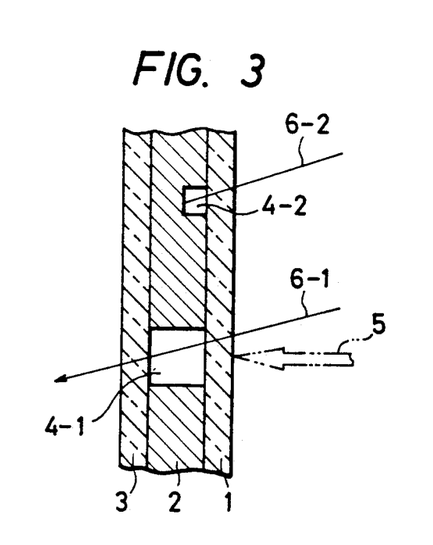

FIG. 3 show another embodiment using a colored liquid in the gel-containing liquid layer 2.

When there is no irradiation of infrared beam, the gel is not heated and thus is in a shrunk state (4-2). That is, the beam (6-2) passing through the gel (4-2) or its neighborhood is absorbed by the colored liquid.

When an infrared beam 5 is irradiated onto a predetermined site of the gel-containing liquid layer a according to an information signal, etc. from the right side on the drawing, the irradiated site (4-1) is heated, and thus the gel (4-1) absorbs only the solvent to undergo swelling. As a result, the colored liquid is removed therefrom only by the amount of the swelling of gel, and thus the beam (6-1) can pass through the gel-containing liquid layer 2. The swollen gel (4-1) shrinks with lowering temperature and returns to the original state to shut off the beam again.

The light modulation principle using a colored liquid is as described above, and similar optical effects can be also obtained in the case of an optical device of reflection type.

In the case of polymers that act to release a liquid at a higher temperature to undergo shrinking, the same optical effects as above can be obtained in principle.

Light modulation principle using a colored gel will be described below, referring to FIG. 4.

When there is no irradiation of infrared beam, the gel is not heated and thus is in a shrunk state (4-2). The beam (6-2) passing through the gel (4-2) and its neighborhood is absorbed or partially absorbed, and weakened.

When an infrared beam 5 is irradiated onto a predetermined site of the gel-containing liquid layer 2 according to an information signal, etc. from the right side on the drawing, the irradiated site (4-1) is heated, and thus the colored gel absorbs only the solvent to undergo swelling (4-1). As a result, the coloring matter is diluted only by the amount of swelling of the colored gel. Thus, the beam (6-1) passing therethrough is not so much absorbed, and can pass through the gel-containing liquid layer 2.

The swollen, colored gel 4-1 shrinks with lowering temperature and returns to the original state to shut off the beam again.

Figure 5:
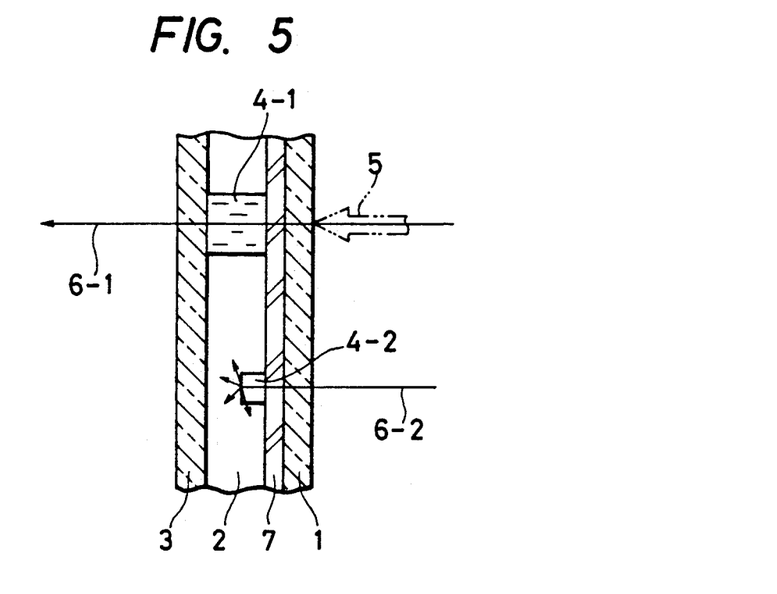

FIG. 5 shows a further embodiment using a radiation-absorbing layer 7 to enhance the efficiency of thermal energy absorption of the gel-containing liquid layer 2, where the image formation and light modulation principle are the same as described above.

Effect

The principle effects of the present invention are summarized below:

(1) Gel can be made finer as desired, and thus output or image with a high clearness and a high resolving power can be obtained.

(2) Gel can be readily prepared, and thus optical devices can be readily prepared.

(3) There is no limitation to the angle of visual field, and observation at a broader angle is possible.

(4) Various coloring materials can be used, and thus a rich color display can be obtained.

(5) Owing to the provision of an infrared-absorbing layer, the energy efficiency can be increased.

The present invention will be described in detail below, referring to Examples.

EXAMPLE 1

Preparation of an optical device

The present optical device was prepared in the following manner.

7.5 g of acrylamide, 1.5 g of acrylic acid, 0.2 g of N,N-methylenebisacrylamide, and 0.3 ml of tetramethylethylenediamine were dissolved in cold water to make 28 ml of the solution.

Separately, 0.1 g of ammonium persulfate was dissolved in 2 ml of cold water, and the thus obtained solution was mixed with the said solution. The mixture was immediately dispersed in a solvent mixture of 45 ml of chloroform, 145 ml of toluene, and 2 ml of sorbitan trioleate. The dispersion was stirred at room temperature for 30 minutes, and the thus obtained polymer gel was washed with a solvent.

The polymer gel was dispersed in an aqueous 50% acetone solution, and after an equilibrium was thoroughly reached, the dispersion was sealed between 2 square glass plates, 50×50 mm, using a Mylar film (trade name, supplied by DuPont), 10 μm thick, as a spacer.

Display and Modulation

The thus prepared optical device was exposed to irradiation of semi-conductor laser beam (power 30 mW; wavelength 830 nm) from the back side in a substantially vertical direction thereto according to an information signal [FIG. 1(a)].

At the same time, visible illumination light was irradiated thereon.

The illumination light put into an assembly of gel (4-2) exposed to no irradiation of the laser beam was scattered, and the site looked milk-white when viewed from the side of the transparent protective plate 3. On the other hand, the site (4-1) heated by the irradiation of the laser showed a light transmission. These two sites were clearly discriminated. The heated site returned to the original in a transparent state, when the temperature at the heated site was lowered. That is, the display action and the light modulation action were confirmed. Furthermore, repetitions could be made, and its reproducibility was confirmed.

EXAMPLE 2

Preparation of an optical device

The present optical device was prepared in the following manner.

7.5 g of acrylamide, 1.6 g of methacrylic acid, 0.2 g of N,N-methylenebisacrylamide, and 0.3 ml of tetramethylethylenediamine were dissolved in cold water to make 28 ml of the solution. Separately, 0.1 g of ammonium persulfate was dissolved in 2 ml of cold water, and the thus obtained solution was mixed with the said solution. The mixture was immediately dispersed in a solvent mixture of 45 ml of chloroform, 145 ml of toluene, and 2 ml of sorbitan trioleate. The dispersion was stirred at room temperature for 30 minutes, and then the thus obtained polymer gel was washed with a solvent.

The polymer gel was dispersed in an aqueous 75% methanol solution, and after an equilibrium was reached, the dispersion was sealed between two square glass plates, 50×50 mm, using a Mylar film having a thickness of 10 μm as a spacer.

Display and light modulation

The same results as in Example 1 were obtained when tested in the same manner as in Example 1.

EXAMPLE 3

Preparation of an optical device

The present optical device was prepared in the following manner.

7.5 g of N-isopropylacrylamide, 0.2 g of N,N-methylenebis-acrylamide, and 0.3 ml of tetramethylethylenediamine were dissolved in cold water to make 28 ml of the solution.

Separately, 0.1 g of ammonium persulfate was dissolved in 2 ml of cold water, and the thus obtained solution was mixed with the said solution. The mixture was immediately dispersed in a solvent mixture of 45 ml of chloroform, 145 ml of toluene and 2 ml of sorbitan trioleate. The dispersion was stirred at room temperature for 30 minutes, and the thus obtained polymer gel was washed with a solvent.

The polymer gel was dispersed in cold water, and sufficiently swollen, and then the dispersion was sealed between two square glass plates, 50×50 mm, using a Mylar film having a thickness of 10 μm as a spacer.

Display and modulation

Figure 2A:
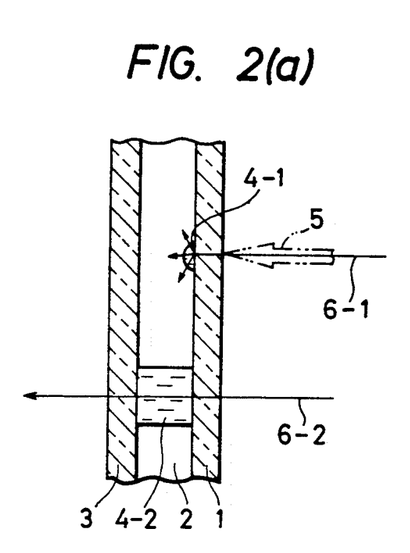
FIGS. 2 to 5 are views of a schematic structure according to other embodiments of the present invention.
Figure 2B:
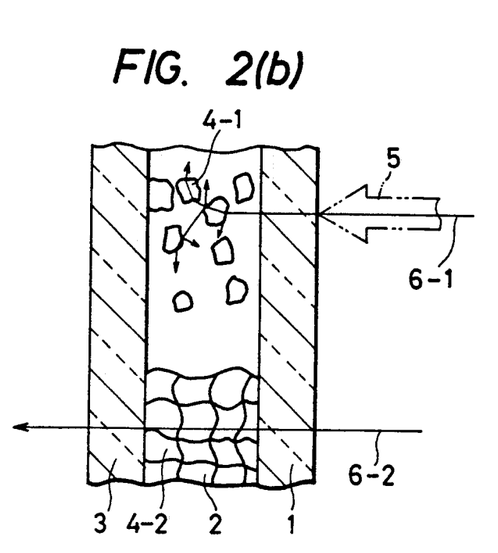

The thus prepared optical device was exposed to a semi-conductor laser beam (power 30 mW; wavelength 830 nm) from the back side in a substantially vertical direction according to an information signal [FIG. 2(a)].

At the same time, visible illumination light was irradiated thereon.

The illuminating light irradiated on the assembly of gel particles unexposed to the irradiation of laser beam was transmitted therethrough, whereas the site heated by the laser irradiation showed the intransmission because of the gel shrinking and turned opaque. These two sites were clearly discriminated. The heated site returned to the original transmission with lowering temperature. Thus, the display action and the light modulation action were confirmed. Repetitions could be made, and its reproducibility was confirmed.

EXAMPLE 4

Preparation of an optical device

The present optical device was prepared in the following manner.

Liquid-absorbable and releasable polymer M-100 (trademark of a product made by Mitsui-Toatsu K.K., Japan) was pulverized to an average particle size of 0.7 μm in a ball mill, dispersed in cold water, and stirred for a while to make thorough swelling. The thus obtained slurry was sealed into two square glass plates, 50×50 mm, using a Mylar film having a thickness of 10 μm as a spacer.

Display and light modulation

The same results as in Example 3 were obtained, when tested in the same manner as in Example 3.

EXAMPLE 5

Preparation of an optical device

The present optical device was prepared in the same manner as follows.

0.75 g of acrylamide, 0.20 g of sodium acrylate, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus obtained solution was mixed with the said monomer solution. The mixture was immediately poured into a solvent mixture of 25 ml of carbon tetrachloride, 75 ml of toluene, and 1 ml of sorbitan trioleate, and vigorously stirred in a nitrogen atmosphere.

After the end of polymerization, the thus formed polymers were thoroughly washed with hexane, and then with acetone to make coagulation. Then, washing was repeated alternately with an aqueous 50% acetone solution and an aqueous 70% acetone solution, and finally shrinking was carried out in an aqueous 70% acetone solution.

A predetermined amount of the polymers was dispersed in a colored solution containing 2 g of Brilliant Carmine 3B (C.I. Pigment Red 60: C.I. 16015-Lake) dispersed in 100 ml of an aqueous 60% acetone solution, and the thus obtained dispersion was dispersed between two square glass plates, 50×50 mm, using a Mylar film having a thickness of 20 μm as a spacer.

Display and modulation

The thus prepared optical device was exposed to irradiation of semi-conductor laser beam (power 30 mW; wavelength 830 nm) from the back side in a substantially vertical direction according to an information signal (FIG. 3).

At the same time, visible illumination light was irradiated thereon.

The illumination light put in the assembly of gel (4-2) not exposed to the irradiation of laser beam was scattered, and the color of the liquid was observed at the side when viewed from the side of transparent protective plate 3.

On the other hand, the gel was swollen at the site heated by the irradiation of laser beam (4-1) to eliminate the colored liquid therefrom, and thus a light transmission was given. These two sites were clearly discriminated. The heated site returned to the original color of the colored liquid with lowering temperature. Thus, the display action and the light modulation action were observed.

Repetitions could be carried out many times, and its reproducibility was confirmed.

EXAMPLE 6

Preparation of an optical device

The present optical device was prepared in the following manner.

0.75 g of acrylamide, 0.20 g of sodium acrylate, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus obtained solution was mixed with the said monomer solution. The mixture was immediately poured into a liquid mixture of 100 ml of liquid paraffin and 1 ml of sorbitan trioleate, and vigorously stirred in a nitrogen atmosphere.

After the end of polymerization, the thus formed polymers were thoroughly washed with hexane and then with acetone to make coagulation. Washing was further repeated alternately with an aqueous 50% acetone solution and an aqueous 70% acetone solution, and finally shrinking was made in an aqueous 70% acetone solution.

A predetermined amount of the polymers was dispersed in a colored solution containing 2 g of Vulkan Fast Orange GG (C.I. Pigment Orange 14: C.I. 21165) dispersed in 100 ml of an aqueous 60% acetone solution, and the dispersion was sealed between two square glass sheets, 50×50 mm, using a Mylar film having a thickness of 20 μm as a spacer.

Display and modulation

Substantially same results as in Example 5 were obtained, when tested in the same manner as in Example 5.

EXAMPLE 7

Preparation of an optical device

The present optical device was prepared in the following manner. 0.80 g of N-isopropylacrylamide, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus prepared solution was mixed with the said monomer solution. The mixture was immediately poured into a solvent mixture of 25 ml of carbon tetrachloride, 75 ml of toluene, and 1 ml of sorbitan trioleate, and vigorously stirred in a nitrogen atmosphere.

After the end of polymerization, the thus obtained polymers were thoroughly washed with hexane and then with acetone, and further with water, and washing was repeated alternately.

A predetermined amount of the polymers was dispersed in a colored solution containing 2 g of Vulkan Fast Orange GG (C.I. Pigment Orange 14; C.I. 21165) dispersed in 100 ml of water to make swelling and obtain a slurry.

A Mylar film having a thickness of 20 μm was inserted between two glass plates, 50×60 mm to make a clearance, and the slurry was filled in the clearance.

Display and modulation

The thus prepared optical device was exposed to irradiation of semi-conductor laser beam (power 30 mW; wavelength 830 nm) from the back side in a substantially vertical direction according to an information signal.

At the same time, visible illumination light was irradiated thereon.

The illumination light put into the assembly of gels not exposed to the irradiation of the laser beam was transmitted therethrough, whereas the portion heated by the irradiation of laser beam was shrunk, and showed the color of colored solution, because the portion was occupied by the colored solution. The heated portion recovered the original transmissivity with lowering temperature. Thus, the display action and light modulation action were confirmed. Repetitions could be made many times, and its reproducibility was confirmed.

EXAMPLE 8

Preparation of an optical device

The present optical device was prepared in the following manner.

0.77 g of N-isopropylacrylamide, 0.02 g of N,N-methylenebisacrylamide, and 50 μl of tetramethylethylenedine were dissolved in 14 ml of water.

Separately, 20 mg of ammonium persulfate was dissolved in 1 ml of water, and the thus prepared solution was mixed with the said monomer solution. Then, the mixture was poured into a solvent mixture of 25 ml of carbon tetrachloride, 75 ml of toluene, and 1 ml of sorbitan trioleate and vigorously stirred in a nitrogen atmosphere.

After the end of polymerization, the thus obtained polymers were washed with hexane, then with acetone, and further with water. Washing was repeated.

A predetermined amount of the said polymers was dispersed in a colored solution containing 2 g of Brilliant Carmine 3B (C.I. Pigment Red 60: C.I. 16015-Lake) dispersed in 100 ml of water to make swelling and obtain a slurry.

A Mylar film having a thickness of 20 μm was inserted between two glass plates, 50×60 mm, to make a clearance, and the slurry was filled in the clearance.

Display and light modulation

The same results as in Example 7 were obtained, when tested in the same manner as in Example 7.

EXAMPLE 9

Preparation of an optical device

The present optical device was prepared in the following manner.

In an ice bath, 0.80 g of N-isopropylacrylamide, 0.02 g of N,N-methylenebisacrylamide, 20 μl of tetramethylethylenediamine, and 10 mg of ammonium persulfate were dissolved in a colored solution containing 50 mg of Monastral Red (C.I. Pigment Violet 19; C.I. 46500) dispersed in 14 ml of water in a ball mill. After nitrogen purging, polymerization was carried out at 20° C., and then 30 ml of water was added to the thus formed colored gel. The gel was pulverized in an emulator. The colored gel particles were washed alternately with cold water and an aqueous 50% acetone solution. Finally, the gel was made to swell with cold water and sealed into a clearance of 20 μm formed between two glass plates, 50×50 mm, by a Mylar spacer.

Display and light modulation

Figure 4:
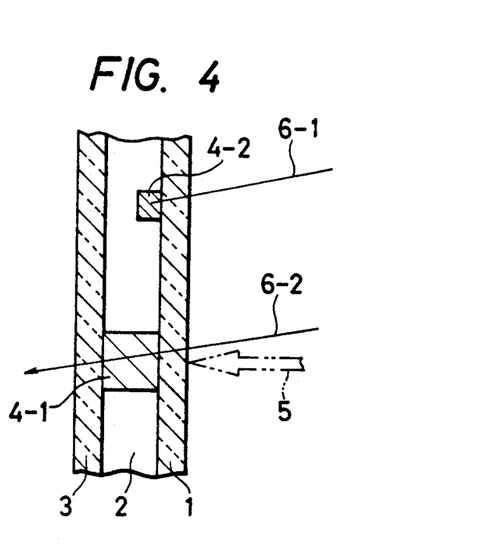

The thus prepared optical device was exposed to exposure to semi-conductor laser beam (power 30 mW, wavelength 830 nm) from the back side in a substantially vertical direction according to an information signal (FIG. 4).

At the same time, visible illumination light was also irradiated thereon.

The illumination light put in the assembly of colored gel particles not subjected to the irradiation of a laser beam (4-2) was transmitted therethrough, whereas the portion (4-1) heated by the irradiation of laser beam underwent shrinking to enhance the concentration of the coloring material contained therein, and thus absorbed the illumination light passing therethrough. The heated portion showed the original light transmission with lowering temperature.

The display action and light modulation action were thus confirmed. As a result of many repetitions, the reproducibility was confirmed.

EXAMPLE 10

Preparation of an optical device

The present optical device was prepared in the following manner.

In an ice bath, 0.80 g of N-isopropylacrylamide, 0.02 g of N,N-methylenebisacrylamide, 20 µl of tetramethylethylenediamine, and 10 mg of ammonium persulfate were dissolved in a colored solution containing 60 mg of Diamond Black (C.I. Pigment Black 1; C.I. 50440) dispersed in 14 ml of water in a ball mill. After nitrogen purging, polymerization was carried out at 20° C. 30 ml of water was added to the thus obtained colored gel, and the gel was pulverized in an emulator. The colored gel was washed alternately with cold water and an aqueous 50% acetone solution. Finally, the gel was made to swell by cold water to make a slurry, and the slurry was sealed between two glass plates, 50×50 mm, kept at a clearance of 20 µm with a Mylar spacer.

Display and light modulation

The same results as in Example 9 were obtained in the same manner as in Example 9.

EXAMPLE 11

Preparation of an optical device

The present optical device was prepared in the following manner.

In an ice bath, 0.75 g of acrylamide, 0.15 g of acrylic acid, 0.02 g of N,N-methylenebisacrylamide, 20 µl of tetramethylethylenediamine, and 10 mg of ammonium persulfate were dissolved in a colored solution containing 50 mg of Monastral Red (C.I. Pigment Violet 19, C.I. 46500) dispersed in 14 ml of water in a ball mill. After nitrogen purging, polymerization was carried out at 20° C. 30 ml of water was added to the thus formed colored gel, and the gel was pulverized in an emulator.

The colored gel was washed alternately with an aqueous 70% acetone solution and with an aqueous 50% acetone solution. Finally, the colored gel was dispersed in an aqueous 60% acetone solution and the dispersion was sealed between two glass plates, 50×50 mm, while keeping a clearance of 20 µm with a Mylar film.

Display and light modulation

The thus prepared optical device was exposed to irradiation of semi-conductor laser beam (power 30 mW, wavelength 830 nm) from the back side in a substantially vertical direction according to an information signal.

At the same time, visible illumination light was irradiated thereon.

The illumination light put in the assembly of colored gel particles not exposed to the irradiation of laser beam was absorbed by the colored gel, and the site showed the color of the colored gel or intransmissivity when viewed from the side of the transparent protective plate, whereas the portion heated by the irradiation of laser beam showed a light transmission. The heated portion showed the color of original colored gel or intransmissivity with lowering temperature.

The display function and the light modulation action were thus confirmed. As a result of many repetitions, its reproducibility was confirmed.

EXAMPLE 12

Preparation of an optical device

The present optical device was prepared in the following manner.

In an ice bath, 0.75 g of acrylamide, 0.17 g of methacrylic acid, 0.02 g of N, N-methylenebisacrylamide, 20 µl mine, and 10 ml of ammonium persulfate were dissolved in a colored solution containing 50 mg of Monastral Red (C.I. Pigment Violet 19; C.I. 46500) dispersed in 14 ml of water in a ball mill. After nitrogen purging, polymerization was carried out at 20° C. 30 ml of water was added to the thus formed colored gel, and the gel was pulverized in an emulator. The colored gel was washed alternately with an aqueous 70% acetone solution, and with an aqueous 45% acetone solution. Finally, the colored gel was dispersed in an aqueous 60% acetone solution, and the dispersion was sealed between two glass plates, 50×50 mm, while keeping a clearance of 20 µm with a Mylar film.

Display and light modulation

The same results as in Example 11 were obtained, when tested in the same manner as in Example 11.

EXAMPLE 13

Preparation of an optical device

The present optical device was prepared in the following manner.

A layer of Gd.Tb.Fe (gadolinium-terbium-iron) having a film thickness of 1,500 Å was deposited on the surface of a square glass substrate, 50×50 mm, by sputtering to form an infrared-absorbing layer 7.

Then, 7.5 g of acrylamide, 1.5 g of acrylic acid, 0.2 g of N,N-methylenebisacrylamide, and 0.3 ml of tetramethylethylenediamine were dissolved in cold water to make 28 ml of the solution.

Separately, 0.1 g of ammonium persulfate was dissolved in 2 ml of cold water, and the thus prepared solution was mixed with the said solution. The mixture was immediately dispersed in a solvent mixture of 45 ml of chloroform, 145 ml of toluene and 2 ml of sorbitan trioleate, and stirred at room temperature for 30 minutes. The thus obtained polymer gel was washed with a solvent.

The polymer gel was dispersed in an aqueous 50% acetone solution and made to reach a thorough equilibrium.

Then, a transparent square glass substrate 3, 50×50 mm and the glass substrate 1 provided with the said infrared-absorbing layer were made to face each other with the infrared-absorbing layer inside, and a clearance was provided by inserting a Mylar film having a thickness of 20 µm therebetween. The dispersion was filled in the clearance.

Display and light modulation

The infrared-absorbing layer 7 of the present optical device was exposed to irradiation of semi-conductor laser beam (power 20 mW, wavelength 830 nm) from the back side in a substantially vertical direction according to an information signal.

At the same time visible illumination light was irradiated thereon from the side of the transparent protective glass plate.

The illumination light put into the assembly of gel particles (4-2) not exposed to the irradiation of laser beam was scattered, and the site was seen opaque, when viewed from the side of the transparent protective plate 3, whereas the portion (4-1) heated by the irradiation of laser beam showed a light transmission, and the beam introduced therein was reflected at the infrared-absorbing layer and emitted from the device. These two sites were clearly discriminated. The heated portion recovered to the original intransmissivity with lowering temperature. The display action and light modulation action were thus confirmed.

Repetitions could be made, and its reproducibility was confirmed.

EXAMPLE 14

Preparation of an optical device

The present optical device was prepared in the following manner.

A layer of $SiO_2$ having a film thickness of 1,500Å was deposited on the surface of a square glass plate, 50×50 mm, by sputtering to form an infrared-absorbing layer 7.

Then, 7.5 g of acrylamide, 1.6 g of methacrylic acid, 0.2 g of N,N-methylenebisacrylamide, and 0.3 ml of tetramethylethylenediamine were dissolved in cold water to make 28 ml of the solution.

Separately, 0.1 g of ammonium persulfate was dissolved in 2 ml of cold water, and the thus prepared solution was mixed with the said solution. The mixture was immediately dispersed in a solvent mixture of 45 ml of chloroform, 145 ml of toluene and 2 ml of sorbitan trioleate. The dispersion was stirred at room temperature for 30 minutes, and the thus obtained polymer gel was washed with a solvent.

The polymer gel was dispersed in an aqueous 75% methanol solution and made to reach thorough equilibrium.

Then, a square transparent glass substrate 3, 50×50 mm, and the said glass plate 1 provided with the infrared-absorving layer were made to face each other with the infrared-absorbing layer face inside, and a clearance was formed therebetween by inserting a Mylar film having a thickness of 20 μm therebetween the said dispersion was filled in the clearance.

Display and light modulation

The thus prepared optical device was exposed to irradiation of semi-conductor laser beam (power 30 mW, wavelength 830 nm) from the back side in a substantially perpendicular direction according to an information signal.

At the same time, visible illumination light was irradiated thereon from the back side (FIG. 5).

The illumination light put in the assembly of gel (4-2) not exposed to the irradiation of laser beam was scattered, and the site looked milk-white, when viewed from the side of the transparent protective plate 3, whereas the portion (4-1) heated by the irradiation of laser beam showed a light transmission. These two sites were clearly discriminated. The heated portion returned to the original intransmission with lowering temperature. The display action and the light modulation action were thus confirmed.

Repetitions could be made and its reproducibility was confirmed.

EXAMPLE 15

Preparation of an optical device

The present optical device was prepared in the following manner.

A layer of Gd.Tb.Fe (gadolinium-terbium-iron) having a thickness of 1,500 Å was deposited onto the surface of a square glass substrate, 50×50 mm, to form an infrared-absorbing layer 7.

Then, 7.5 g of N-isopropylacrylamide, 0.2 g of N,N-methylenebisacrylamide, and 0.3 ml of tetramethylethylenediamine were dissolved in cold water to make 28 ml of the solution.

Separately, 0.1 g of ammonium persulfate was dissolved in 2 ml of cold water, and the thus prepared solution was mixed with the said solution. The mixture was dispersed in a solvent mixture of 45 ml of chloroform, 145 ml of toluene, and 2 ml of sorbitan trioleate. The dispersion was stirred at room temperature for 30 minutes, and the thus obtained polymer gel was washed with a solvent.

The polymer gel was dispersed in cold water to make thorough swelling.

Then, a square transparent glass substrate 3, 50×50 mm, and the glass substrate 1 provided with the infrared-absorbing layer made to face each other with the infrared-absorbing layer face inside, and a clearance was formed therebetween by inserting a Mylar film having a thickness of 20 μm therebetween. The dispersion was filled in the clearance.

Display and light modulation

The infrared-absorbing layer 7 of the thus prepared optical device was exposed to irradiation of semi-conductor laser beam (power 20 mW, wavelength 830 nm) from the back side in a substantially perpendicular direction according to an information signal.

At the same time, visible illumination light was irradiated thereon from the side of the transparent protective glass plate 3.

The illumination light introduced into the assembly of gel particles (4-2) not exposed to the irradiation of laser beam was reflected at the infrared-absorbing layer and emitted from the device, whereas the portion heated by the irradiation of laser beam showed opacity and looked milk-white due to the shrinking of the gel. These two sites were clearly discriminated. The heated portion returned to the original light transmission with lowering temperature. The display action and the light modulation action were thus confirmed. Repetitions could be made, and its reproducibility was confirmed.

EXAMPLE 16

Preparation of an optical device

The present optical device was prepared in the following manner.

A layer of $SiO_2$ having a film thickness of 1,500 Å was deposited on the surface of a square glass substrate, 50×50 mm, by sputtering to form an infrared-absorbing layer 7.

The glass plate with the infrared-absorbing layer and a square transparent glass plate, 50×50 mm, were made to face with each other with the infrared-absorbing layer face inside, and a clearance was formed therebetween by inserting a Mylar film having a thickness of 10 μm therebetween.

A liquid-absorbable and releasable polymer M-100 (trademark of a product made by Mitsui-Toatsu Kagaku K.K., Japan) was pulverized in a ball mill to an average particle size of 0.7 μm, and then dispersed in cold water. The dispersion was stirred for a while to make thorough swelling.

The thus obtained slurry was filled into the clearance between the glass plates.

Display and light modulation

The thus prepared optical device was exposed to irradiation of semi-conductor laser beam (power 20 mW, wavelength 830 nm) from the back side in a substantially vertical direction according to an information signal.

At the same time, visible illumination light was irradiated thereon from the back side.

The illumination light put in the assembly of gel particles not exposed to the irradiation of laser beam could pass therethrough, whereas the portion heated by the irradiation of laser beam shrunk and showed opacity. These two sites were clearly discriminated. The heated portion recovered the original light transmissivity with lowering temperature. The display action and the light modulation action were thus confirmed.

Repetitions could be made, and the reproducibility was confirmed.

EXAMPLE 17

Preparation of an optical device

The present optical device was prepared in the following manner.

A layer of $SiO_2$ having a film thickness of 1,500 Å was deposited onto the surface of a square glass substrate, 50×50 mm, by sputtering to form an infrared-absorbing layer 7.

Then, 0.75 g of acrylamide, 0.20 g of sodium acrylate, 0.02 g of N,N-methylenebisacrylamide and 50 μl of tetramethylethylenediamine were dissolved in 14 ml of water.

Separately, 20 mg of ammonium persulfate was dissolved in 1 ml of water, and the thus prepared solution was mixed with the said monomer solution. The mixture was poured into a solvent mixture of 25 ml of carbon tetrachloride, 75 ml of toluene and 1 ml of sorbitan trioleate, and vigorously stirred in a nitrogen atmosphere.

After the end of polymerization, the thus formed polymers were thoroughly washed with hexane, and then with acetone to make coagulation. Washing was further repeated alternately with an aqueous 50% acetone solution and with an aqueous 70% acetone solution. Finally, shrinking was caused in an aqueous 70% acetone solution.

A predetermined amount of the said polymers was dispersed in a colored solution containing 2 g of Brilliant Carmine 3B (C.I. Pigment Red 60; C.I. 16015Lake) dispersed in 100 ml of an aqueous 60% acetone solution.

Then, a square transparent glass substrate 3, 50×50 mm, and the glass substrate 1 provided with the infrared-absorbing layer were made to face each other with the infrared-absorbing layer face inside, and a clearance was made therebetween by filling a Mylar film having a thickness of 20 μm therebetween. The dispersion was filled in the clearance.

Display and color modulation

The infrared-absorbing layer 7 of the thus prepared optical device was exposed to irradiation of semi-conductor laser beam (power 20 mW, wavelength 830 nm) from the back side in a substantially vertical direction according to an information signal.

At the same time, visible illumination light was irradiated thereon from the back side.

The illumination light put in the assembly of gel not exposed to the irradiation of laser beam was scattered, and the color of the colored solution was seen at the side, when viewed from the side of the transparent protective plate 3, whereas at the portion heated by the irradiation of laser beam the gel was swollen to eliminate the colored solution therefrom. Thus, the portion showed a light transmissivity. These two sites were clearly discriminated, and the heated portion returned to the original color of the colored solution with lowering temperature.

Repetitions could be made, and the reproducibility was confirmed.

The display action and the light modulation action were thus confirmed.

EXAMPLE 18

Preparation of an optical device

The present optical device was prepared in the following manner.

A layer of Gd.Tb.Fe (gadolinium-terbium-iron) having a film thickness of 1,500 Å was deposited on the surface of a square glass substrate, 50×50 mm, by sputtering to form an infrared-absorbing layer.

Then, 0.75 g of acrylamide, 0.25 g of sodium methacrylate, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus prepared solution was mixed with the said monomer solution. Then, the mixture was poured into a solvent mixture of 25 ml of carbon tetrachloride, 75 ml of toluene, and 1 ml of sorbitan trioleate, and vigorously stirred in a nitrogen atmosphere.

After the end of polymerization, the thus formed polymers were thoroughly washed with hexane, and then with acetone to make coagulation. Washing was further repeated alternately with an aqueous 40% acetone solution and with an aqueous 70% acetone solution, and finally shrinking was made in an aqueous 65% acetone solution.

A predetermined amount of the polymers was dispersed in a colored solution containing 2 g of Brilliant Carmine 3B (C.I. Pigment Red 60; C.I. 16015Lake) dispersed 100 ml of an aqueous 60% acetone solution.

Then, a square transparent glass substrate 3, 50×50 mm, and the glass substrate 1 provided with the infrared-absorbing layer were made to face each other with the infrared-absorbing layer face inside, and a clearance was made therebetween by inserting a Mylar film having a thickness of 20 μm therebetween. The dispersion was filled in the clearance.

Display and color modulation

The infrared-absorbing layer 7 of the thus prepared optical device was exposed to irradiation of semi-conductor laser beam (power 20 mW, wavelength 830 nm)

from the back side in a substantially vertical direction according to an information signal.

At the same time, visible illumination light was irradiated thereon from the side of the transparent glass plate 3.

The illumination light put in the assembly of gel not exposed to the irradiation of laser beam was absorbed by the colored solution, and the color of the colored solution was observed at the site, when viewed from the side of the transparent protective plate 3, whereas the portion heated by the irradiation of laser beam was swollen to eliminate the colored solution therefrom. Thus, the site showed a light transmissivity and the light introduced thereinto was reflected and emitted from the device.

These two sites were clearly discriminated. The heated portion returned to the original color of the colored solution with lowering temperature. Repetitions could be carried out many times, and its reproducibility was confirmed.

EXAMPLE 19

Preparation of an optical device

The present optical device was prepared in the following manner.

A layer of Gd.Tb.Fe having a film thickness of 1,500 Å was deposited onto the surface of a square glass substrate, 50×50 mm, by sputtering to form an infrared-absorbing layer 7.

Then, 0.75 g of acrylamide, 0.20 g of sodium acrylate, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus prepared solution was mixed with the said monomer solution. Then, the mixture was immediately poured in a mixture of 1 ml of sorbitan trioleate and 100 ml of liquid paraffin and vigorously stirred in a nitrogen atmosphere.

After the end of polymerization, the thus formed polymers were thoroughly washed with hexane, and then with acetone to make coagulation. Washing was further repeated alternately with an aqueous 50% acetone solution and with an aqueous 70% acetone solution, and finally shrinking was made in an aqueous 70% acetone solution.

A predetermined amount of the polymers was dispersed in a colored solution containing 2 g of Vulkan Fast Orange GG (C.I. Pigment Orange 14; C.I. 21165) dispersed in 100 ml of an aqueous 60% acetone solution.

Then, a square transparent glass substrate 3, 50×50 mm, and the glass substrate provided with the infrared-absorbing layer were confronted to make the infrared-absorbing layer face inwardly, and a clearance was formed therebetween by inserting a Mylar film having a thickness of 20 μm therebetween. The dispersion was filled in the clearance.

Display and color modulation

The same results as in Example 18 were obtained, when tested in the same manner as in Example 18.

We claim:

1. An optical device, which comprises a liquid layer containing a liquid-absorbable and releasable polymer that absorbs and releases a liquid under thermal action, and a liquid, wherein said liquid-absorbable and releasable polymer is a crosslinked polymer and absorbs a liquid to undergo swelling and releases the liquid to undergo shrinking, and said liquid contains pigments or polymer-bound dyes, wherein said pigments or polymer-bound dyes do not penetrate the inside of said liquid-absorbable and releasable polymer when said polymer absorbs the liquid.

2. An optical device, which comprises a liquid layer containing a liquid-absorbable and releasable colored polymer that absorbs and releases a liquid under thermal action, wherein said liquid-absorbable and releasable polymer is a crosslinked polymer and absorbs a liquid to undergo swelling and releases the liquid to undergoshrinking, and is obtained, in order to hold a colored material on the inside of said liquid-absorbable and releasable polymer even if said polymer releases or absorbs the liquid, by chemically binding said polymer with said colored material or by enclosing giant particles of said colored material in reticular structure of said crosslinked polymer so as not to fall off said reticular structure of said crosslinked polymer.

* * * * *

UNITED STATES PATENT AND TRADEMARK OFFICE
CERTIFICATE OF CORRECTION

PATENT NO. : 5,007,714
DATED : April 16, 1991
INVENTOR(S) : Yukuo Nishimura et al.

It is certified that error appears in the above-identified patent and that said Letters Patent is hereby corrected as shown below:

COLUMN 1:

Line 5, "No. 810,489" should read --No. 810,249--.

COLUMN 2:

Line 65, "oligoethylene" should read --oligoethylene oxide--.

COLUMN 7:

Line 14, "lenebis-acrylamide," should read --lenebisacrylamide,--.

COLUMN 10:

Line 8, "thylethylenedine" should read --thylenediamine--.

COLUMN 12:

Line 12, "mine," should read --of tetramethylethylenediamine,--.

UNITED STATES PATENT AND TRADEMARK OFFICE
CERTIFICATE OF CORRECTION

PATENT NO. : 5,007,714
DATED : April 16, 1991
INVENTOR(S) : Yukuo Nishimura et al.

It is certified that error appears in the above-identified patent and that said Letters Patent is hereby corrected as shown below:

COLUMN 13:

Line 44, "red-absorving" should read --red-absorbing--.

Line 47, "the" should read --and the--.

COLUMN 16:

Line 56, "dispersed" should read --dispersed in--.

COLUMN 18:

Line 36, "undergoshrinking," should read --undergo shrinking,--.

Signed and Sealed this

Twenty-sixth Day of November, 1991

Attest:

HARRY F. MANBECK, JR.

*Attesting Officer*  *Commissioner of Patents and Trademarks*